United States Patent [19]

Katayama

[11] Patent Number: 5,915,066
[45] Date of Patent: Jun. 22, 1999

[54] OUTPUT CONTROL SYSTEM FOR SWITCHABLE AUDIO CHANNELS

[75] Inventor: Yoshitaka Katayama, Yokohama, Japan

[73] Assignee: Kabushiki Kaisha Toshiba, Kawasaki, Japan

[21] Appl. No.: 08/602,450

[22] Filed: Feb. 16, 1996

[30] Foreign Application Priority Data

Feb. 16, 1995 [JP] Japan ................................. 7-027944

[51] Int. Cl.⁶ .......................... H04N 5/781; H04N 5/783
[52] U.S. Cl. ............................... 386/70; 386/95; 386/99; 386/108
[58] Field of Search ..................... 348/473, 481, 348/483, 485, 632, 738; 386/97, 99, 95–96, 70, 108; 360/80; 369/2–3; H04N 5/781, 5/783

[56] References Cited

U.S. PATENT DOCUMENTS

| | | |
|---|---|---|
| 4,143,333 | 3/1979 | Jacobsen et al. . |
| 4,569,026 | 2/1986 | Best . |
| 5,130,815 | 7/1992 | Silverman et al. . |
| 5,130,816 | 7/1992 | Yoshio . |
| 5,208,745 | 5/1993 | Quentin et al. .......................... 364/188 |
| 5,218,672 | 6/1993 | Morgan . |
| 5,224,087 | 6/1993 | Maeda . |
| 5,241,659 | 8/1993 | Parulski . |
| 5,245,600 | 9/1993 | Yamauchi . |
| 5,315,570 | 5/1994 | Miura . |
| 5,336,844 | 8/1994 | Yamauchi . |
| 5,388,093 | 2/1995 | Yoshida . |
| 5,390,158 | 2/1995 | Furuhashi . |
| 5,410,676 | 4/1995 | Huang . |
| 5,414,455 | 5/1995 | Hooper . |
| 5,469,370 | 11/1995 | Ostrover et al. ........................ 364/514 |
| 5,481,542 | 1/1996 | Logston et al. ........................ 370/94.3 |
| 5,513,010 | 4/1996 | Kori . |
| 5,539,716 | 7/1996 | Furuhashi . |
| 5,546,367 | 8/1996 | Yoshimura . |

FOREIGN PATENT DOCUMENTS

| | | |
|---|---|---|
| 57-067336 | 4/1982 | European Pat. Off. .......... H04B 1/10 |
| A-0 381 807 | 8/1990 | European Pat. Off. . |
| 406021 | 1/1991 | European Pat. Off. . |
| A-0 459 157 | 12/1991 | European Pat. Off. . |
| 0 574 239 A1 | 6/1992 | European Pat. Off. . |
| 0 589 068 A1 | 3/1994 | European Pat. Off. . |
| 677842 | 10/1995 | European Pat. Off. . |
| 93923665 | 8/1996 | European Pat. Off. . |
| 02276071 | 4/1989 | Japan ............................. G11B 20/12 |
| 4-245089 | 2/1992 | Japan . |
| 6-44686 | 2/1994 | Japan . |
| 7176175 | 7/1995 | Japan . |

OTHER PUBLICATIONS

Patent Abstracts of Japan; Publication No. JP57143989, Publication Date Jun. 9, 1982; vol. 6, No. 247.
Patent Abstracts of Japan; vol. 006, No. 144 (E–122), 3 Aug. 1982 & JP–A–57 067336 (Sony Corp), 23 Apr. 1982.

Primary Examiner—Andrew I. Faile
Assistant Examiner—Vincent Boccio
Attorney, Agent, or Firm—Pillsbury Madison & Sutro LLP

[57] ABSTRACT

A disk player for an optical disk on which recorded are many data blocks having video data and audio data with multi-audio channels. The player includes an audio channel selector for selecting from the multi-audio channels a specific audio channel specified by a system controller The audio data of the selected audio channel is input, via an audio demodulator, to a gain-controlled amplifier whose gain is set by a gain control signal supplied from the system controller. When a request for switching from a first audio channel to a second channel is generated during reproduction of the first audio channel, the system controller controls to fade out the audio output of the first channel and, thereafter, to fade in the audio output of the second channel upon completion of the fading-out of the first audio channel.

28 Claims, 13 Drawing Sheets

Fig. 11

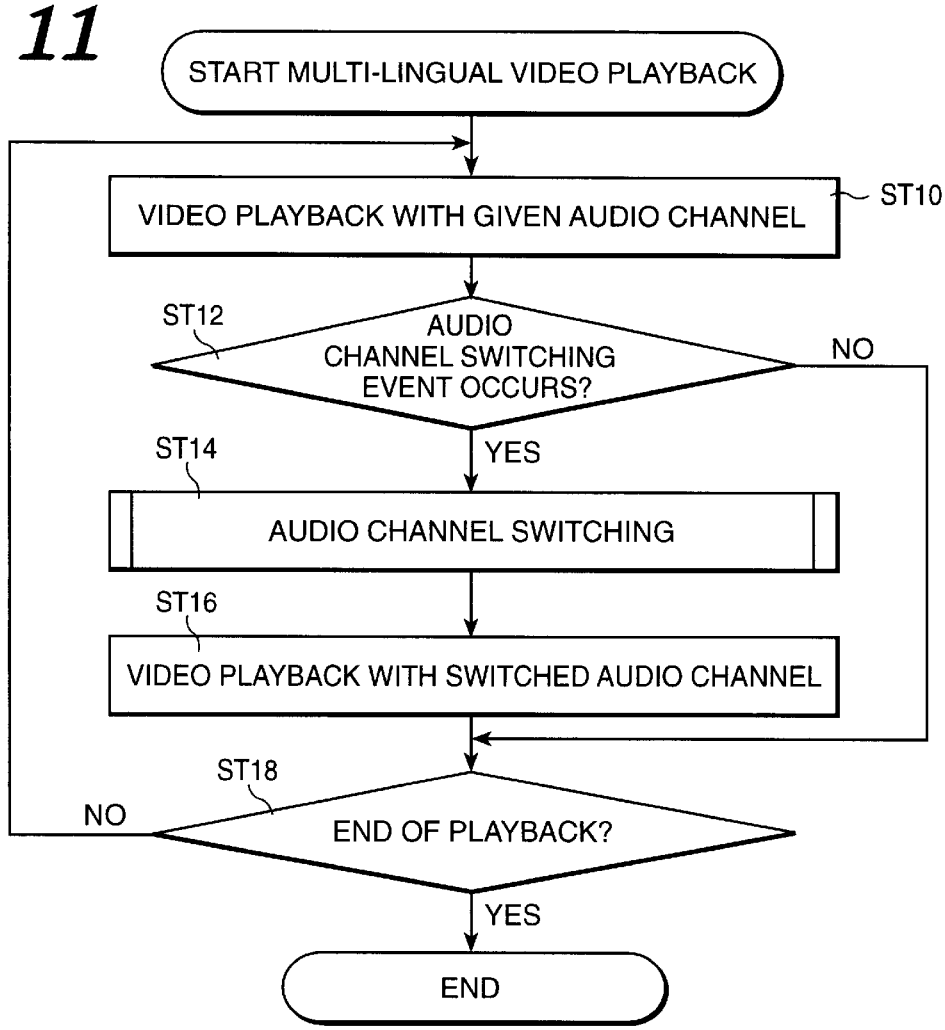

<EVENT AT ST12>
SWITCHING EVENT 1> USER OPERATION:
  CURRENT MULTI-ANGLE BLOCK (MULTI-SCENE) IS
  SWITCHED TO ANOTHER MULTI-ANGLE BLOCK
SWITCHING EVENT 2> USER OR COMMAND OPERATION:
  VOLUME / TITLE IS SWITCHED VIA MENU DURING PLAYBACK;
  OR PROCESS IS LINKED TO MENU ROUTINE BY NAV COMMAND
SWITCHING EVENT 3> USER OR COMMAND OPERATION:
  MOTION MODE IS CHANGED TO STILL MODE;
  OR STILL MODE IS SET BY NAV COMMAND
SWITCHING EVENT 4> USER OPERATION:
  FF / REW OR SLOW / REVERSE IS EXECUTED DURING PLAYBACK
SWITCHING EVENT 5> USER OR COMMAND OPERATION:
  CELL / TITLE IS VOLUNTARILY SEARCHED;
  OR PROCESS IS JUMPED TO OTHER BY NAV COMMAND
SWITCHING EVENT 6> SYSTEM OPERATION:
  END OF CURRENT PROGRAM CHAIN PGC IS DETECTED AND
  CURRENT PGC IS AUTOMATICALLY SWITCHED TO NEXT PGC
SWITCHING EVENT 7> USER OR COMMAND OPERATION:
  CONTENT OF SUB-PICTURE IS CHANGED DURING PLAYBACK

OUTPUT CONTROL SYSTEM FOR SWITCHABLE AUDIO CHANNELS

BACKGROUND OF THE INVENTION

1. Field of the Invention

The present invention relates to a recording medium reproduction (or playback) apparatus such as an optical disk player and, more particularly, to a recording medium reproduction apparatus for reproducing desired data from a recording medium on which both video data and audio data having a plurality of audio channels are recorded.

2. Description of the Related Art

In recent years, with the advance of moving picture data compression encoding techniques represented by MPEG (Moving Picture Image Coding Expert Group) 1, long-playback-time moving picture information can be recorded even on an optical disk. Attempts have been made to record data including video and audio data, such as a movie and karaoke, on an optical disk having a size equal to that of a CD (Compact Disk). The development of reproduction apparatuses (disk players) for that purpose and efforts for making such development are active today.

In one recently proposed scheme, compression-encoded video data and audio data of one or more audio channels are combined in lengths, each determined with reference to a predetermined reproduction time (e.g., 1 second), to form blocks. The blocks are recorded on an optical disk, and one of the audio channels is selected to reproduce audio data together with the video data in the reproduction mode. For example, audio data of different languages such as Japanese, English, and Italian are recorded as audio data of a movie.

In this audio multiplex recording scheme, a desired audio channel can be arbitrarily selected and switched in accordance with the choice of a user or audience. In switching audio reproduction from a given audio channel to another audio channel, noise is undesirably generated upon the audio channel switching, thereby discomforting the audience.

Another problem is poor operability of audio channel selection. More specifically, when audio data of a plurality of audio channels are simply recorded on an optical disk, the user or audience cannot easily determine the correspondence between specific audio channels and specific contents of various types of audio data.

In the recording medium reproduction apparatus for reproducing desired data from a recording medium on which video data and audio data of a plurality of audio channels are recorded, noise is undesirably generated during audio channel switching. In addition, this apparatus has poor operability of audio channel selection.

SUMMARY OF THE INVENTION

The present invention has been made to solve the problems described above, and has as its object to provide a recording medium reproduction apparatus capable of effectively inhibiting or suppressing generation of noise during audio channel switching.

The present invention has been made to solve the conventional problems described above, and has as its another object to provide a recording medium reproduction apparatus capable of improving operability of audio channel selection.

In order to achieve the above objects, according to the first aspect of the present invention, there is provided a recording medium reproduction apparatus for reproducing a recording medium on which blocks having video data and audio data of a plurality of channels are recorded, comprising channel selection means for selecting audio data of an arbitrary channel of the plurality of channels, reproduction means for reproducing the audio data of the channel, selected by the channel selection means, together with video data in a block to which the audio data of the selected channel belongs, and audio output control means for controlling to fade out an audio output of a first channel and fade in an audio output of a second channel upon completion of fade-in of the audio output of the first channel when a switching request for switching from the first channel to the second channel is generated during reproduction of audio data of the first channel.

In order to achieve the above objects according to the second aspect of the present invention, in the recording medium reproduction apparatus of the first aspect, the audio output control means controls to start fade-in of the audio output of the second channel at a reproduction start timing of the next block upon completion of the fade-out of the audio output of the first channel during the reproduction thereof.

In order to achieve the above objects according to the third aspect of the present invention, there is provided a recording medium reproduction apparatus for reproducing a recording medium on which blocks having video data and audio data of a plurality of channels are recorded, comprising channel selection means for selecting audio data of an arbitrary channel of the plurality of channels, reproduction means for reproducing the audio data of the channel, selected by the channel selection means, together with video data in a block to which the audio data of the selected channel belongs, and audio output control means for controlling to mute an audio output during a reproduction period of a current block from a timing at which a channel switching instruction is generated, and start an audio output of a second channel from the next block when the switching request for switching from the first channel to the second channel is generated during reproduction of audio data of the first channel.

In order to achieve the above objects according to the fourth aspect of the present invention, there is provided a recording medium reproduction apparatus for reproducing a recording medium on which blocks having video data and audio data of a plurality of channels are recorded, comprising channel selection means for selecting audio data of an arbitrary channel of the plurality of channels, reproduction means for reproducing the audio data of the channel, selected by the channel selection means, together with video data in a block to which the audio data of the selected channel belongs, and input means for externally inputting a channel number to be selected by the channel selection means (note that the channel number is a serial number assigned to each channel, defining the number of channels recorded on the recording medium as a maximum value).

In order to achieve the above objects according to the fifth aspect of the present invention, the recording medium reproduction apparatus of the fourth aspect further comprises message display means for, when the number exceeding the maximum number is externally input by the input means, displaying message information together with a video image during reproduction in a superposed manner, the message information representing that a number exceeding the maximum number is externally input.

In order to achieve the above objects according to the sixth aspect of the present invention, there is provided a recording medium reproduction apparatus for reproducing a recording medium on which blocks having video data and audio data of a plurality of channels are recorded, comprising channel selection means for selecting audio data of an arbitrary channel of the plurality of channels, reproduction means for reproducing the audio data of the channel, selected by the channel selection means, together with video data in a block to which the audio data of the selected channel belongs, and channel count display means for displaying the number of channels of the audio data recorded on the recording medium in accordance with an external request.

In order to achieve the above objects according to the seventh aspect, the recording medium reproduction apparatus of the sixth aspect further comprises channel content display means for displaying contents of audio data on the recording medium in units of channels.

In order to achieve the above objects according to the eighth aspect of the present invention, there is provided a recording medium reproduction apparatus for reproducing a recording medium on which blocks having video data and audio data of a plurality of channels are recorded, comprising channel selection means for selecting audio data of an arbitrary channel of the plurality of channels, reproduction means for reproducing the audio data of the channel, selected by the channel selection means, together with video data in a block to which the audio data of the selected channel belongs, and audio output control means for controlling to decrease a slew rate of an audio output of a first channel and increase a slew rate of an audio output of a second channel upon completion of a decrease in slew rate of the audio output of the first channel when a switching request for switching from the first channel to the second channel is generated during reproduction of audio data of the first channel.

In order to achieve the above objects according to the ninth aspect of the present invention, in the recording medium reproduction apparatus, the audio output control means controls to start the increase in slew rate of the audio output of the second channel at a reproduction start timing of the next block upon completion of the decrease in slew rate of the audio output of the first channel during the reproduction thereof.

According to the first aspect, when a switching request for switching from the first channel to the second channel is generated during reproduction of the audio data of the first channel, the audio output of the first channel is faded out. Upon completion of the fade-out, the audio output of the second channel is faded in. Generation of the noise can be effectively inhibited during audio channel switching.

According to the second aspect, when the audio output of the first channel is completely faded out during reproduction, the fade-in of the audio output of the second channel is started at the reproduction start timing of the next block. Therefore, generation of noise during audio channel switching can be effectively inhibited.

According to the third aspect, when a switching request for switching from the first channel to the second channel is generated during reproduction of the audio data of the first channel, the audio output is muted during the reproduction period of the current block from the timing at which the channel switching instruction is generated. The audio output of the second channel is then started from the next block. Therefore, generation of noise during audio channel switching can be inhibited.

According to the fourth aspect, when a channel number exceeding the maximum value of the number of channels recorded on the recording medium is externally input during channel selection, the input of this channel number is invalidated. Therefore, operational disorder caused by external input of an invalid channel number can be prevented.

According to the fifth aspect, when a channel number exceeding the maximum value of the number of channels recorded on the recording medium is externally input during channel selection, message information representing that a channel number exceeding the maximum number is externally input is displayed together with the image during reproduction in a superposed manner. Therefore, confusion on the user side, which is caused by external input of an invalid channel number can be prevented.

According to the sixth aspect, since the number of channels of the audio data recorded on the recording medium is displayed in accordance with an external request, operability of audio channel selection can be improved.

According to the seventh aspect, since the contents of the audio data recorded on the recording medium are displayed in units of channels in accordance with an external request, operability of audio channel selection can be improved.

According to the eighth aspect, when a switching request for switching from the first channel to the second channel is generated during reproduction of the audio data of the first channel, the slew rate of the audio output of the first channel is decreased. Upon completion of the decrease in slew rate of the audio output of the first channel, the slew rate of the audio output of the second channel is increased (returned to the initial value). A change in signal level during audio channel switching can be reduced, and generation of noise can be effectively inhibited accordingly.

According to the ninth aspect, after the slew rate of the audio output of the first channel being reproduced is completely decreased, the slew rate of the audio output of the second channel is increased at the reproduction start timing of the next block. Therefore, generation of noise during audio channel switching can be effectively inhibited

BRIEF DESCRIPTION OF THE DRAWINGS

FIG. 11 is a flowchart for explaining a multi-lingual video playback operation according to the present inventions which operation is controlled by a system control computer (MPU/CPU) contained in the apparatus of FIG. 9 or FIG. 10;

FIG. 10 is integrated.

DETAILED DESCRIPTION OF THE PREFERRED EMBODIMENTS

The preferred embodiments of the present invention will be described in detail with reference to the accompanying drawings.

FIGS. 1 to 19 are provided for explaining an output control system for switchable audio channels according to the preferred embodiments of the invention.

Figure 3:
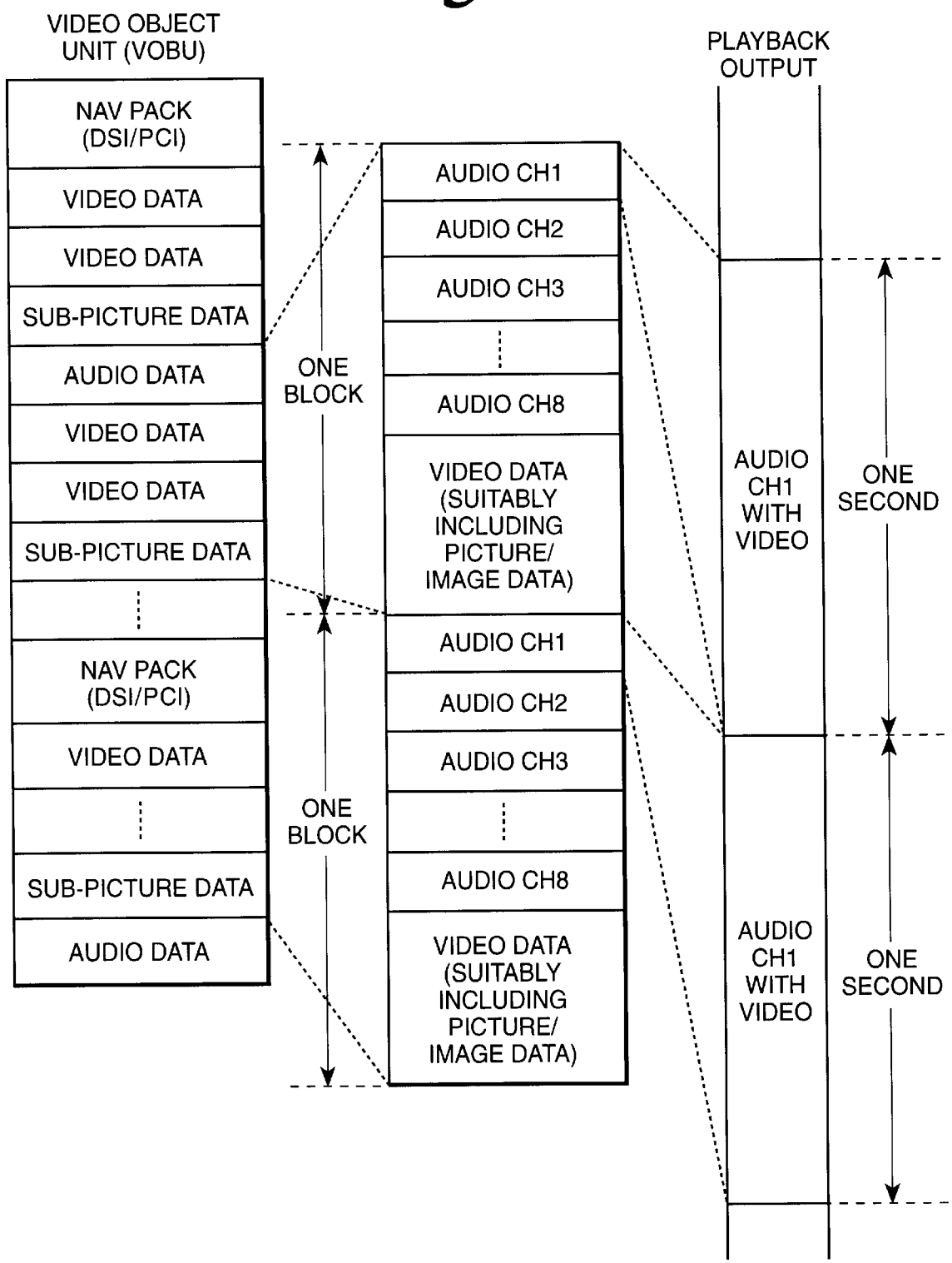
FIG. 3 explains how a video with audio information is reproduced from data (VOBU) having the structure of FIG. 2.

Referring to FIG. 3, data are continuously recorded on an optical disk in units of blocks each comprising a combination of audio data of a plurality of channels (audio channels 1, 2, and 3) and video data. The length of audio data of each channel and the video data in one block is determined with reference to a predetermined reproduction time. For example, the video data and the audio data of each channel have a data length required to reproduce and output audio and video data of 1 second. For example, the multi-lingual audio data of the respective channels are audio data in different languages such as English, French, and Spanish. Note that one or both of the audio data and the video data may be compression-encoded.

In reproduction of an optical disk having this data formats when a user arbitrarily selects one channel from the plurality of audio channels, the audio data of the selected channel is simultaneously reproduced and output with the video data in the same block as an audio and picture of a unit time (1 second).

The arrangement of the optical disk reproduction apparatus for reproducing the optical disk having this data format will be described below.

Figure 9:
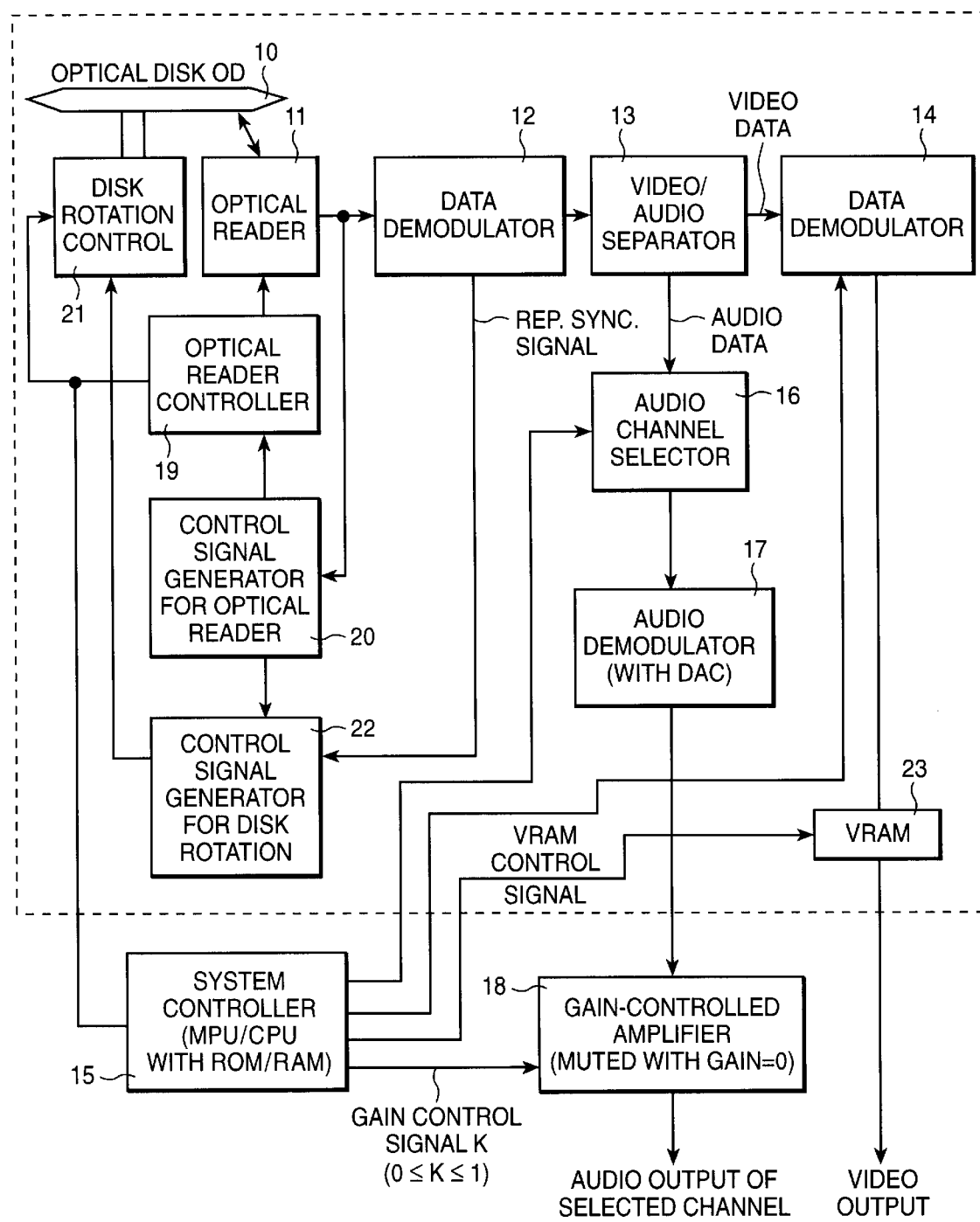
FIG. 9 shows a block diagram of an optical disk reproduction apparatus (optical disk player) being provided with an output control system according to an embodiment of the present invention.

FIG. 9 is a block diagram showing the overall arrangement of this optical disk reproduction apparatus. Referring to FIG. 9, reference numeral 10 denotes an optical disk having spiral tracks on which audio data, video data, and other data are recorded in the data format described above. Reference numeral 11 denotes an optical reading unit for irradiating a laser beam on the surface of optical disk 10 and reading the intensity level of the reflected beam as a reproduced signal. Reference numeral 12 denotes a data demodulator for performing demodulation, error detection, and error correction for reproduced data obtained by binarizing or digitizing the reproduced signal read by optical reading unit 11. Reference numeral 13 denotes a video/audio separator for the reproduced data into audio data and video data after modulation and error detection/correction. Reference numeral 14 denotes a video demodulator for demodulating the video data separated by video/audio separator 13 into an analog signal and outputting the analog signal.

Reference numeral 15 denotes a system controller for controlling the overall optical disk reproduction apparatus. Reference numeral 16 denotes an audio channel selector for selecting audio data of an audio channel designated by an audio channel selection instruction (switching instruction) from system controller 15 and inputting the selected audio data to audio demodulator 17. Audio demodulator 17 demodulates the audio data (digital) of the audio channel selected by audio channel selector 16 into an analog signal and outputs the analog signal. Reference numeral 18 denotes a gain controller for variably changing the amplitude of the analog audio signal output from audio demodulator 17 with a gain set in accordance with a control signal from system controller 15.

Reference numeral 19 denotes an optical reading unit controller for controlling optical reading unit 11. The control operations of controller 19 include tracking servo control and focus servo control. Reference numeral 20 denotes an optical reading unit control signal generator for generating a control signal for controlling to drive optical reading unit controller 19 on the basis of an output from a servo system detector of optical reading unit 11. Reference numeral 21 denotes a disk rotation controller for controlling rotation of optical disk 10. Reference numeral 22 denotes a disk rotation control signal generator for generating a control signal for controlling to drive disk rotation controller 21 on the basis of a reproduction sync signal generated by data demodulator 12.

VRAM (Video RAM) 23 is provided for temporarily storing a small part of the video data read by optical reading unit 11. The data stored in VRAM 23 is, for examples used for a memory playback operation. When the memory playback is in an active mode, no interruption of the video output will occur during a track seeking operation of optical reading unit 11.

An audio channel switching operation in this optical disk reproduction apparatus will be described below.

Figure 4:
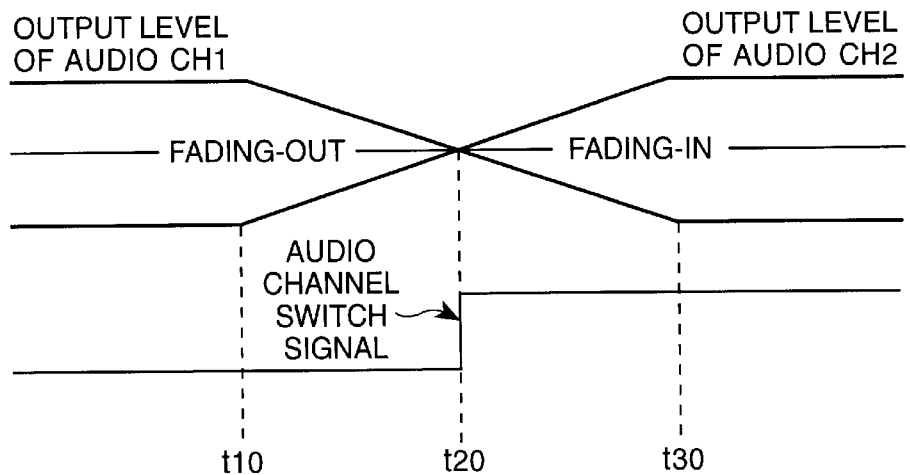
FIG. 4 explains a first example of audio channel switching operation (fading-out/fading-in) wherein the content of audio information (such as language information) is switched from audio channel 1 to audio channel 2.

FIG. 4 shows audio output waveforms obtained when a switching instruction from audio channel 1 to audio channel 2 is generated during the reproduction period of audio channel 1.

Prior to disk reproduction, the user notifies system controller 15 of a desired audio channel for reproduction through an operation unit (not shown). Assume that audio channel 1 is selected. System controller 15 sends a selection instruction for audio channel 1 to audio channel selector 16.

When disk reproduction is started, a reproduced signal obtained by optical reading unit 11 is demodulated by data demodulator 12. Error detection and error correction of this demodulated data are performed. The resultant data is sent to video/audio separator 13. Video data separated and output from video/audio separator 13 is demodulated into an analog signal by video demodulator 14. This analog signal is output as a picture. On the other hands audio data of a plurality of channels separated and output from video/audio separator 13 is input to audio channel selector 16. Audio channel selector 16 selects audio data of audio channel 1 selected and designated by system controller 15 from the audio data of the plurality of channels. The selected audio data is sent to audio demodulator 17. Audio demodulator 17 demodulates the input audio data into an analog signal, and this analog signal is input to gain controller 18. Gain controller 18 variably changes the amplitude of the analog audio signal output from audio demodulator 17 with the gain set in accordance with the control signal from system controller 15.

Until an audio channel switching instruction is input by the user (before t10 in FIG. 4), system controller 15 sets the gain of gain controller 18 to, e.g., "1" so as to output the analog audio signal from audio modulator 17 without changing the amplitude of the signal. When an audio channel switching request is input by the user (t10), system controller 15 gradually reduces the gain of gain controller 8 from "1" to "0" (from t10 to t20). As a result, the audio output of audio channel 1 fades out. When the audio output of audio channel 1 becomes substantially zero (i.e., a timing with a gain of "0" a or t20 in FIG. 4), system controller 15 outputs a switching instruction for switching from audio channel 1 to audio channel 2 to audio channel selector 16. In response to this, data input to gain controller 18 is switched from audio channel 1 to audio channel 2. Simultaneously as system controller 15 outputs the audio channel instructions system controller 15 gradually increases the gain of gain controller 18 from "0" to "1" (from t20 to t30). As a result, the fade-in of the audio output of audio channel 2 is started.

Figure 5:
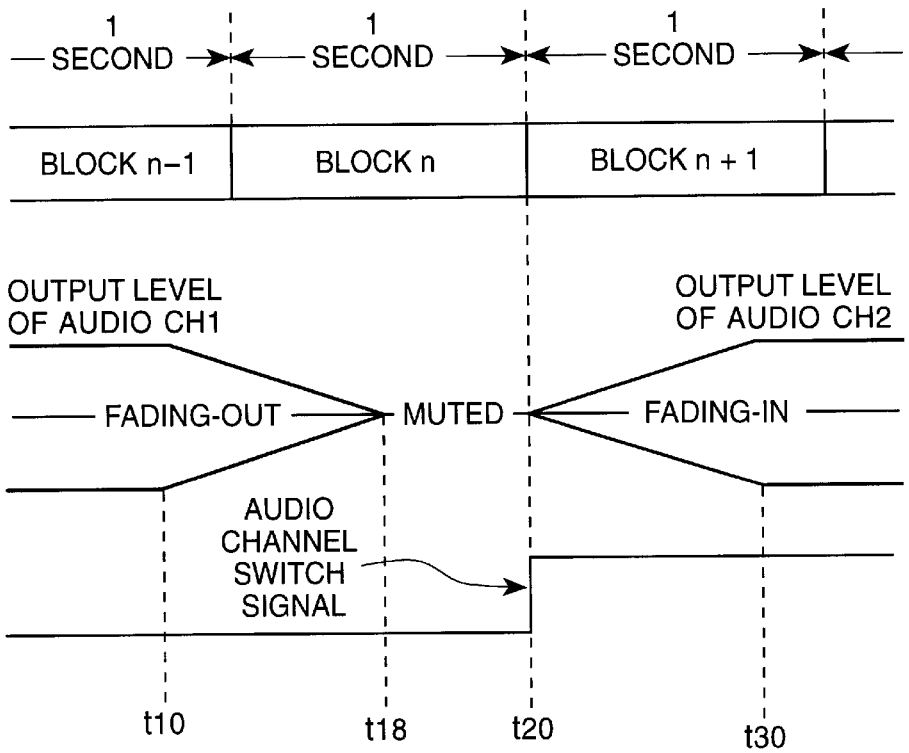
FIG. 5 explains a second example of audio channel switching operation (fading-out/muting/fading-in) wherein the content of audio information (such as language information) is switched from audio channel 1 to audio channel 2.

Audio output switching between different audio channels 1 and 2 can be performed without generating noise through the fade-in/fade-out of the corresponding audio outputs. An audio channel switching method according to another embodiment will be described below. FIG. 5 shows the audio output waveforms when an instruction for switching from audio channel 1 to audio channel 2 is generated during the reproduction period of audio channel 1 as in FIG. 4.

The embodiment in FIG. 5 is different from that in FIG. 4 in the fade-in start timing for the audio output of audio channel 2 upon channel switching. More specifically, in this embodiment, when an instruction for switching from audio channel 1 to audio channel 2 is generated (t10 in FIG. 5) during the reproduction period of audio channel 1 (from t10 to t20), a mute state is set during the remaining reproduction period (from t18 to t20) of the current block (n−1 to n) even upon the fade-out. The fade-in of the audio output of audio channel 2 is started at the reproduction start timing (t20) of the next block (n+1).

Figure 6:
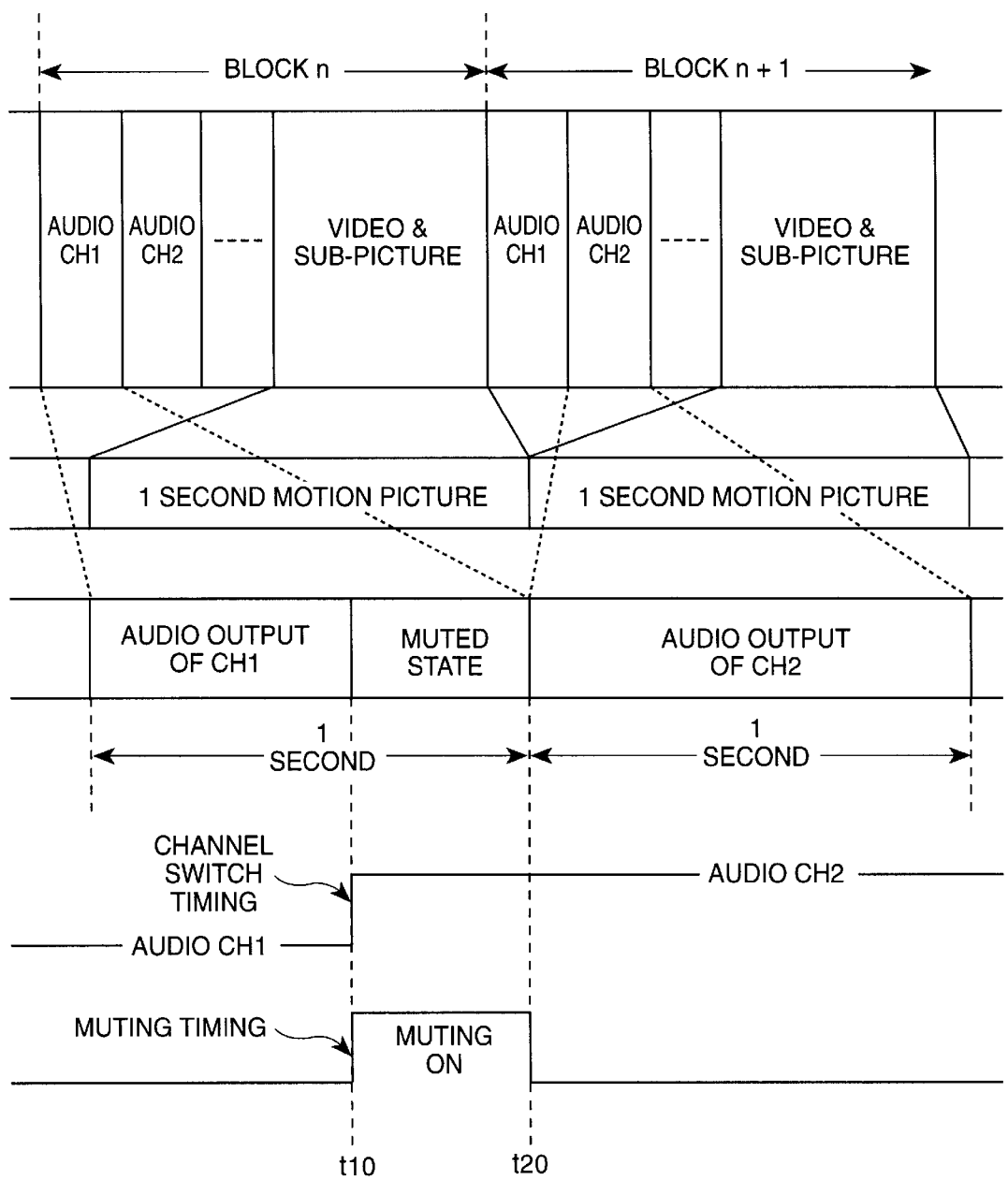
FIG. 6 explains a third example of audio channel switching operation (fading-out/muting/fading-in) wherein the content of audio information (such as language information) is switched from audio channel 1 to audio channel 2.

An audio channel switching method according to still another embodiment will be described with reference to FIG. 6. In this embodiment, a mute state is set for the audio output of audio channel 1 during the remaining reproduction period (t10 to t20) of the current block (n) from a timing (t10) at which an audio channel switching instruction is generated. The audio output of audio channel 2 is output (t20) from the next block (n+1), thereby solving the problem of noise.

Still another embodiment of the present invention will be described below.

The number of audio channels recorded on an optical disk and their types are arbitrary. In practice, the user may designate an audio channel non-recorded on the optical disk with a number in an audio channel switching operation. Note that the channel number is a serial number assigned to each channel, provided that the number of channels recorded on the optical disk is defined as a maximum value. In this case, the reproduction apparatus may malfunction against such an invalid operation.

Figure 7:
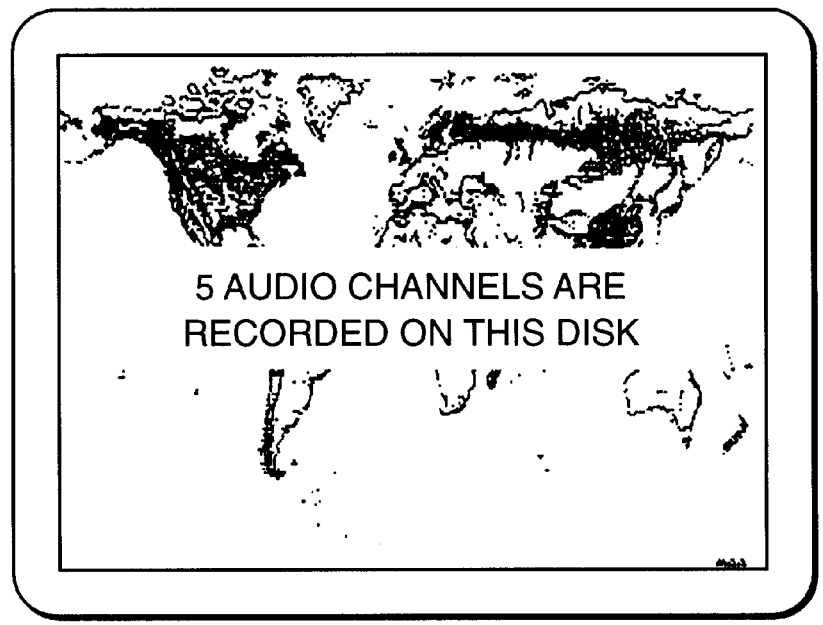
FIG. 7 shows an example of display with warning or attention by which an audience or user can be informed of the currently available numbers of audio channels during the reproduction of a disk.

In this embodiment, information representing the number of audio channels recorded on the optical disk is recorded in a lead-in area (system area, video manager, and file 0 in FIG. 2) in which various management data are recorded, or in a management information area of each title set. This lead-in area is automatically and unconditionally read-accessed during the initialization of the reproduction apparatus, and the loaded data is stored in a memory in the reproduction apparatus. The switched and selected audio channel number is compared with the number of audio channels stored in the memory to determine whether the switching operation of the audio channel itself is a proper behavior for that specific optical disk. If the operation is invalid, it is possible to control not to accept an audio channel switching instruction. In this case, as shown in FIG. 7, a warning or attention message for notifying the user of such a situation is superposed on the video screen during reproduction, thereby preventing any operational discomfort of the user.

Figure 1:
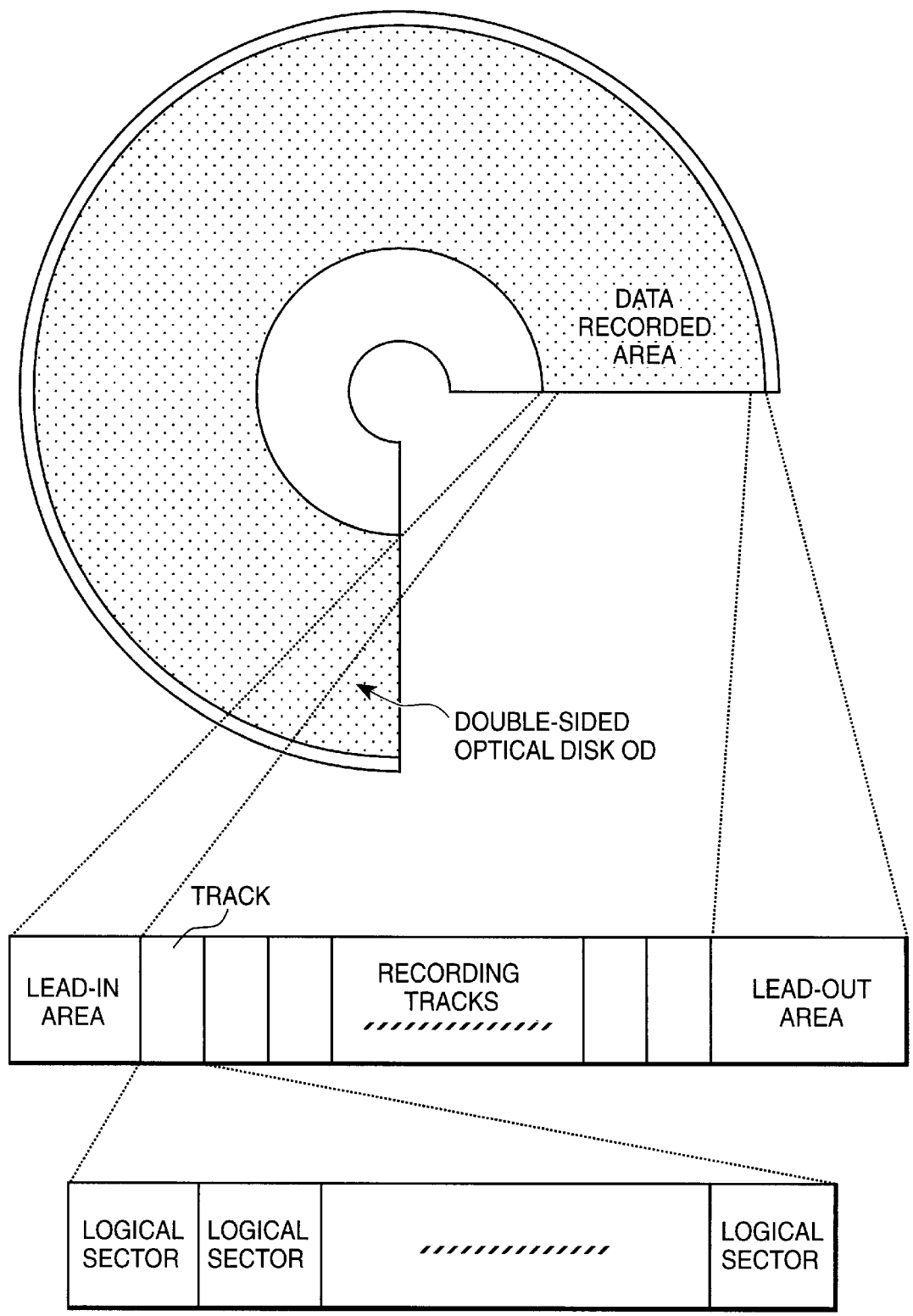
FIG. 1 shows an example of the structure of data recorded on an optical disk which is a typical example of the recording medium to which the present invention can be applied.
Figure 2:
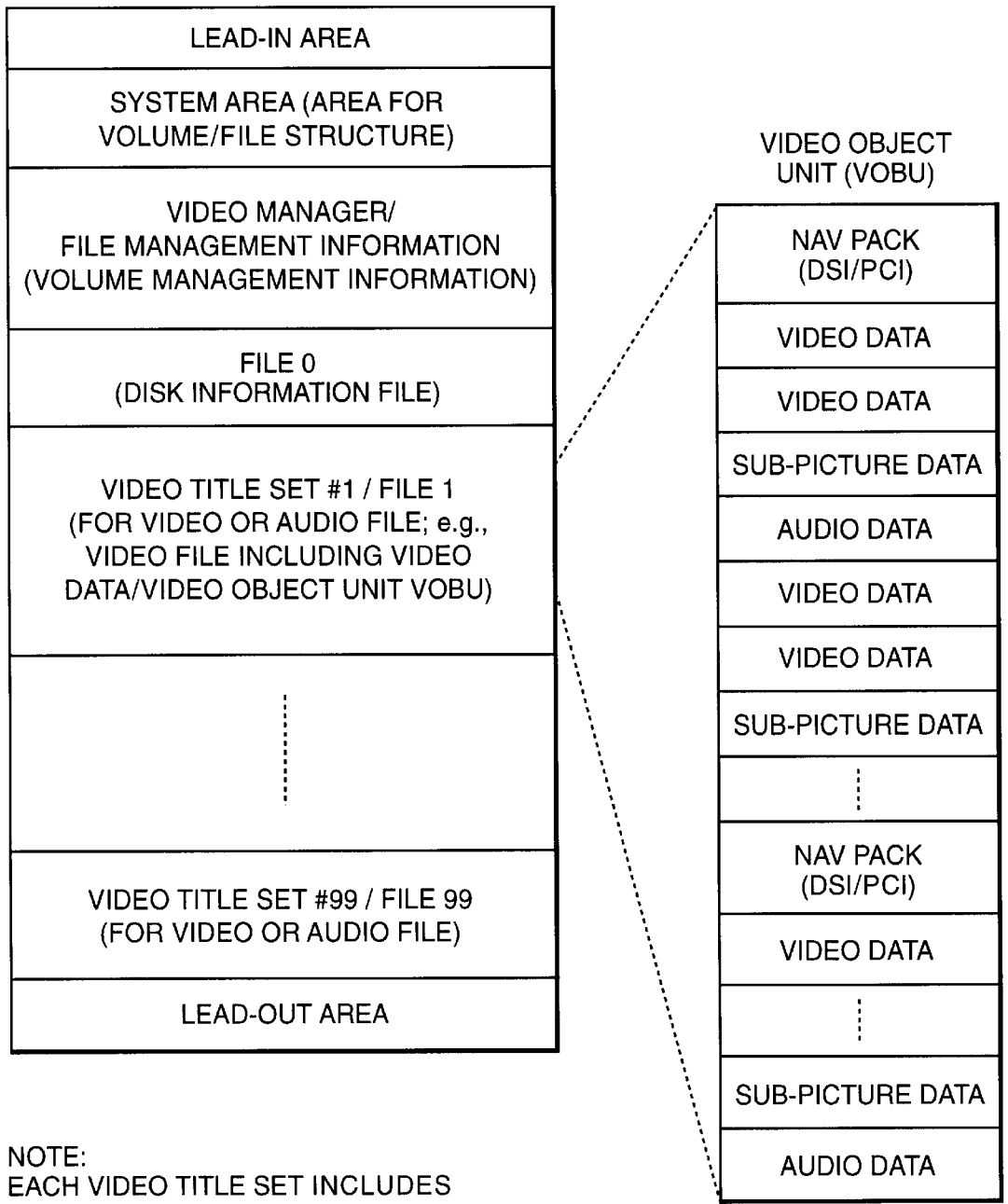
FIG. 2 shows an example of the logical structure of the data recorded on the optical disk of FIG. 1.
Figure 8:
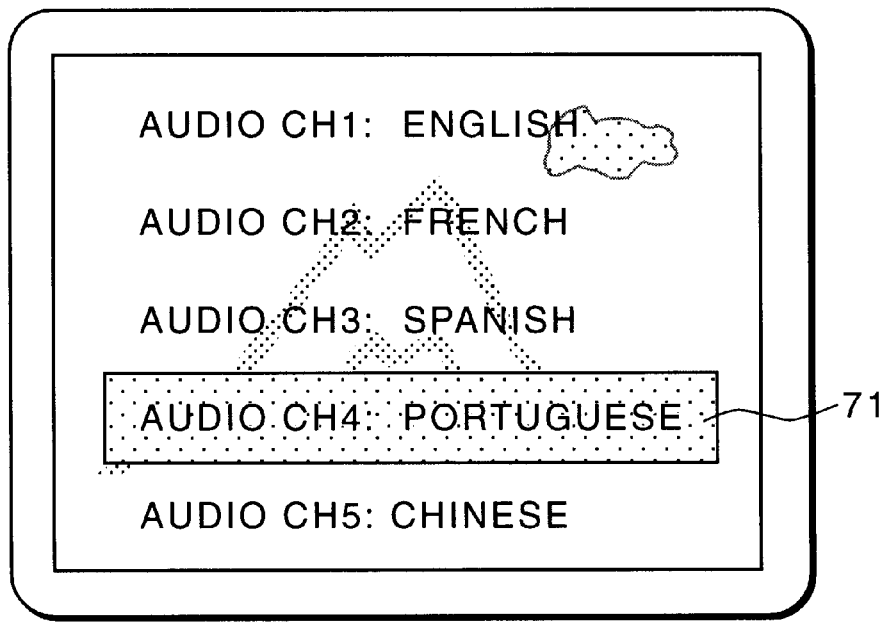
FIG. 8 explains how an audience or user selects his or her desired language from the available audio channels displayed on a screen during reproduction of a disk.

Pieces of information representing the number of audio channels recorded on the optical disk and the contents of their types may be recorded in the lead-in area of FIG. 2, or in the management information area of respective title sets. The contents may be properly read out from the memory in accordance with a request from the user and may be superposed on the video screen during reproduction. An example of this case is shown in FIG. 8. Reference numeral 71 denotes an audio channel currently selected. When the display portion of the currently selected audio channel is emphasized by, e.g., a reversal display or flickering, the operability of audio channel selection can be remarkably improved.

Figure 10:
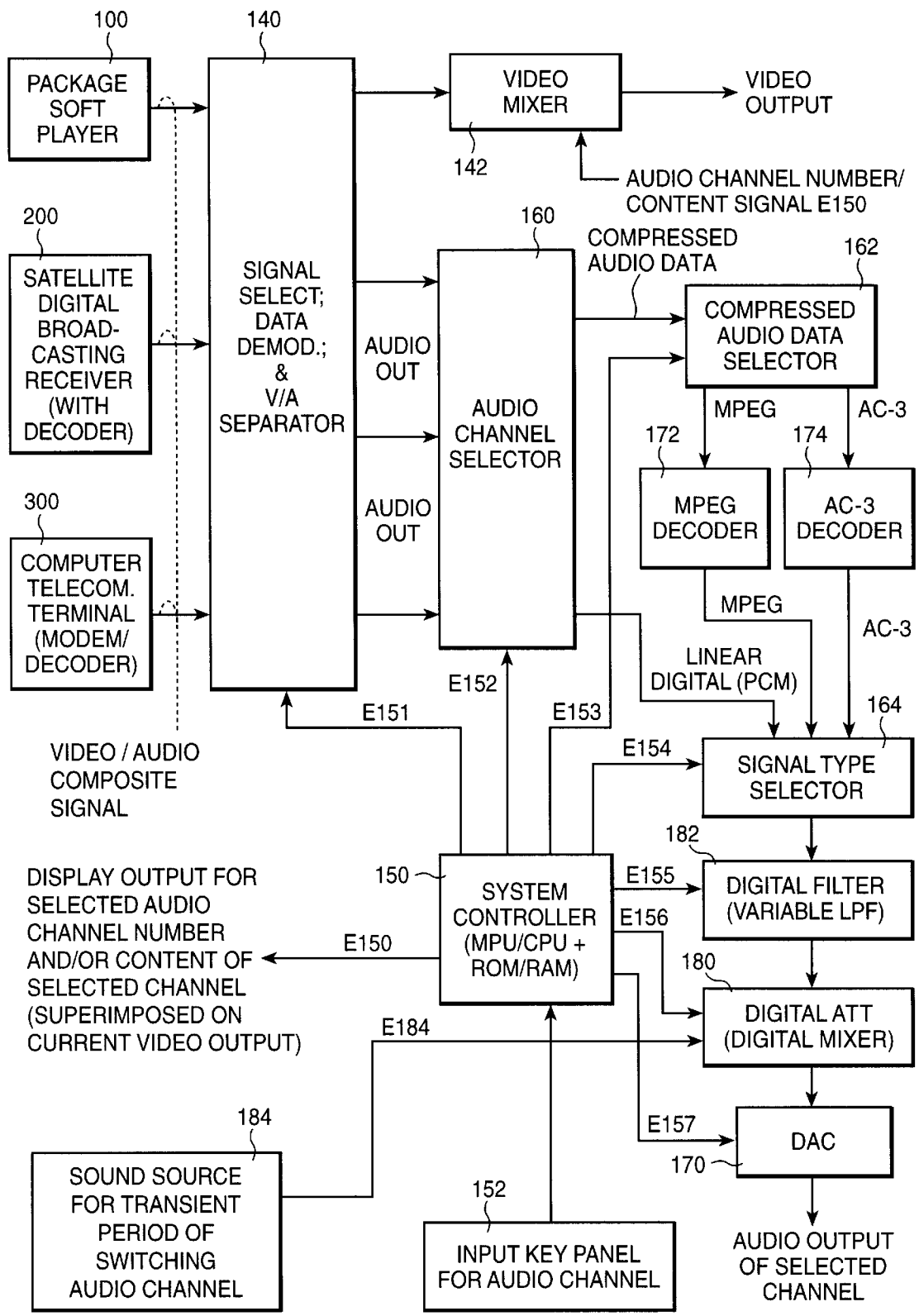
FIG. 10 shows a block diagram of an audio/visual selector being provided with an output control system according to another embodiment of the present invention, wherein various program sources such as package software (optical disk or the like) are freely input to the audio/visual selector.

FIG. 10 shows a block diagram of an audio/visual selector being provided with an output control system according to another embodiment of the present invention, wherein various program sources such as package software (optical disk or the like) are freely input to the audio/visual selector.

A typical example of the package software is an optical disk having a high recording-density and high mass-productivity. Other examples thereof are a magnetic tape, a magnetic disk, a semiconductor memory (such as a flush EEPROM), and the like. These package softwares are reproduced by reproduction apparatus 100 at the user side. The reproduced multi-scene/multi-lingual signal (assumed to be a digital signal) is input to program selector 140 having a function of a signal selecting data demodulation, video/audio separation, etc.

Satellite broadcasting (or cable broadcasting) is also one of important program sources. Digital broadcasting satellite receiver (or cable broadcasting receiver) 200 including a decoder for cancelling scrambles, etc. receives and decodes a multi-scene/multi-lingual signal (digital signal). The received and decoded signal is then input to program selector 140.

Personal computer 300 connected to a wide-area network (e.g., INTERNET) may be one of the program source. A multi-scene/multi-lingual signal (digital) on the network is down-loaded by personal computer 300 equipped with a modem/decoder. The down-loaded signal is also input to program selector 140.

Assume that a user manipulates input key 152 for changing audio channels so as to select optical disk player 100. According to this user manipulation, the MPU of system controller 150 sends selection command E151 to program selector 140. Then, in response to the content of command E151, selector 140 selects the digital signal output (high-frequency signal before demodulation) from player 100.

In selector 140, the selected optical disk player output is demodulated to generate a digital signal of 0/1 series. The generated digital signal contains a video signal component and audio signal component. These signal components are separated in selector 140. The separated video signal component includes main picture data and sub-picture data. The main picture data includes image information of, for example, various scenes of a movie, and the sub-picture data includes bit-mapped data (compressed) of, for example, captions corresponding to the main picture data.

The digital audio signal component separated by selector 140 includes non-compressed or linear PCM data (stereo sound) and/or compressed multi-channel audio data, The linear PCM data and/or the compressed audio data is input to audio channel selector 160.

In response to selection command E152 from MPU 150, selector 160 selects any of multi-channel audio programs (e.g., linear PCM data or compressed audio data of max. 8 channels) from respective program sources (100, 200, 300). (Note that command E152 can be generated by the user manipulation of input key 152. Further, command E152 can be automatically generated by the content of playback control information PCI in the NAV pack of FIG. 2, or by the header information of the audio data in video object unit VOBU.) There are various data types for a non-compressed linear PCM audio; for example, standard audio data (48 kHz sampling) of a SD (super density) disk whose specifications have been proposed recently, high-sampling mode data (96 kHz sampling) of the SD, 44.1 kHz sampling data currently used for a CD (compact disk) or MD (mini-disk), standard mode data (48 kHz sampling) of a DAT (digital audio tape), long play mode data (32 kHz sampling) of the DAT, A mode data (32 kHz sampling) of a BS (broadcasting satellite), B mode data (48 kHz sampling) of the BS, and so on.

As for the compressed audio data, for examples MPEG data and AC-3 (registered trademark) data are known. The compressed audio data such as the MPEG data and AC-3 data are input to compressed audio data selector 162. According to selection command E153 from MPU 150, selector 162 selects either of the MPEG data and AC-3 data. (Command E153 can be generated by a user manipulation of input key 152, or can be generated according to a content of playback control information PCI contained in the NAV pack of FIG. 2.)

If the MPEG audio is selected according to command E153, the selected MPEG compressed data is input to MPEG decoder 172, and the input data is decoded therein. Similarly, when the AC-3 audio is selected according to command E153, the selected AC-3 compressed multi-channel data is input to AC-3 decoder 174, and the input data is decoded therein.

Furthers either one of the linear PCM audio data of a specific channel selected by audio channel selector 160, the MPEG audio data of a specific channel decoded by decoder 172 and selected by compressed audio data selector 162, and the AC-3 audio data of a specific channel decoded by decoder 174 and selected by compressed audio data selector 162, is selected according to the content of selection command E154 from MPU 150. The selected audio data is input to digital attenuator 180, via digital filter 182 having a variable low-pass characteristic. (Note that attenuator 180 has a function for mixing, with a prescribed mixing ratio, digital audio output E184 from sound source 184 to the digital audio output from digital filter 182.)

The amount of attenuating a digital signal by means of attenuator 180 can be freely determined according to attenuation/mixture command E156. Thus, when the audio muting is performed at the timing of switching the audio channel, the attenuating amount of attenuator 180 becomes temporarily large (e.g., −60 dB to −90 dB) in response to command E156.

The digital output from attenuator 180 is converted by DAC 170 into a specific type of analog audio signal(s) (monophonic, 2-channel stereo, 3-1 scheme stereo of a high-definition TV, 5.1 multi-channel surround stereo of AC-3, etc.), and the converted signal(s) is(are) output to an external DAC 170 can handle two or more kinds of sampling frequencies as well as two or more kinds of quantizing bit-numbers (e.g., 12-bit non-linear, 16-bit linear, 18- to 24-bit linear Command E157 from MPU 150 can determine which sampling frequency and which quantizing bit-number are applied to convert the digital signal into an analog signal.

Incidentally, digital filter 182 can have two or more types of low-pass characteristics in accordance with the kinds (various sampling frequencies) of the digital signal passing through the filter. The low-pass characteristic type of digital filter 182 can be changed by command E155 from MPU 150.

Further, only when the audio channel is switched, the cut-off frequency of the low-pass characteristic of digital filter 182 is changed to a very low frequency. More specifically, in order to suppress a transient noise generated when audio channel switching is performed, the cut-off frequency of digital filter 182 is reduced to several tens Hz for a few seconds before and after the audio channel switching, so that the speed of rising the audio signal level (i.e, the slew rate) is significantly lowered. (In this case, digital attenuator 180 may not attenuate the audio output at the time of audio channel switching.)

In place of muting the transient period of the audio channel switching, an announcement with respect to the audio channel switching or a chime sound may be generated. In this case, at digital attenuator 180 having a mixer function, the digital audio announcement or the digital chime sound from sound source 184 is mixed to the audio signal (in a muting state) from digital filter 182. The timing of this mixing can be determined by attenuation/mixture command E156 from MPU 150.

Still further, in order to notify to a user or audience the channel number and/or the active lingual after switching, the following operation can be performed. That is, at the time of the audio channel switching, MPU 150 generates sub-picture signal E150 which contains a message describing the channel number and the lingual activated after switching. Signal E150 thus generated is supplied to video mixer 142.

Figure 18:
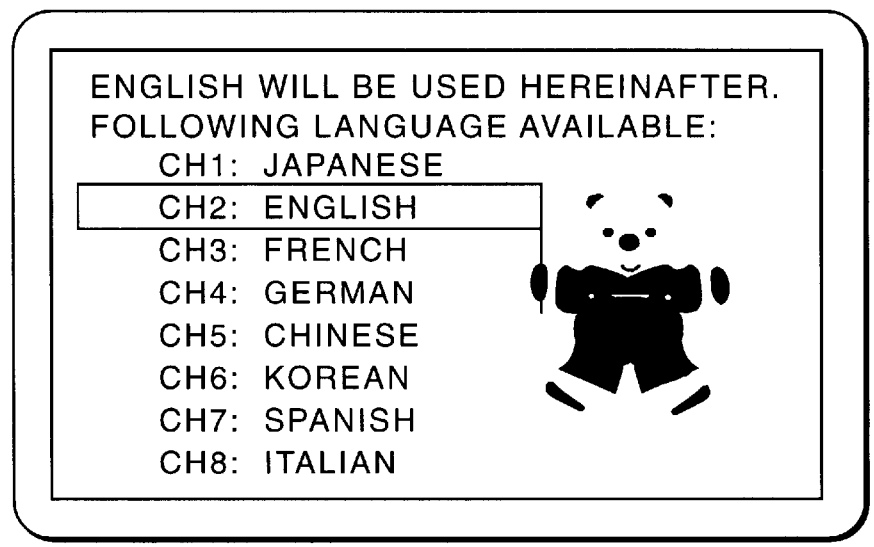
FIG. 18 shows an example of attention display (corresponding to the audio channel switching operation of FIG. 16) performed when the language for the current video is switched from audio channel 1 (Japanese) to audio channel 2 (English)

Mixer 142 receives the digital video signal component (main picture) separated by program selector 140. When sub-picture signal (bit-mapped data of the channel number and the lingual activated after switching) E150 is supplied from MPU 150 to mixer 142, supplied signal E150 is superimposed onto the main picture signal from selector 140. The video output (TV signal) obtained by superimposing signal E150 is input to a video monitor (not shown). Then, a video image as exemplified in FIG. 18 is displayed.

FIG. 11 is a flowchart for explaining a multi-lingual video playback operation according to the present inventions which operation is controlled by a system control computer (MPU/CPU) contained in the apparatus of FIG. 9 or FIG. 10.

Assume that a Japanese movie with captions of eight languages is recorded on optical disk 10, for example. When the playback (reproduction) of disk 10 is started in the apparatus (optical disk player) of FIG. 9 or FIG. 10 the default audio (Japanese) and the default caption (e.g., English, or no caption) are automatically selected unless the user or audience designates a specific audio language and/or specific caption language. The selection information for these default audio and default caption can be stored in playback control information PCI of the NAV pack in video object unit VOBU or in file 0 (disk information file) of FIG. 2, for example.

When the user or audience pushes the playback buttons the video playback for the Japanese movie (main picture) with corresponding Japanese audio voice/sound (and the sub-picture of English caption, if necessary) is started (step ST10 in FIG. 11).

During the playback operations the main picture is output from video demodulator 14 (FIG. 9) or from video mixer 142 (FIG. 10), while the Japanese audio voice/ sound corresponding to the main picture is output from gain-controlled amplifier 18 (FIG. 9) or from DAC 170 (FIG. 10). In this case, the sub-picture suitably contained in the main picture is constituted by an English caption.

Unless a prescribed audio channel switching event is generated (no at step ST12), during the playback operation of the disk (no at step ST18), the selection states of the Japanese audio voice/sound and (optionally) the English caption are maintained. (Details of various switching events will be described later.)

When the prescribed audio channel switching event is generated (yes at step ST12), audio channel switching processing corresponding to the content of the generated event is executed (step ST14). For instance, suppose that the user or audience wants to hear English speech during the video playback, and the English (audio channel 2 in this case) is selected by the key manipulation of input key 152 (FIG. 10). When MPU 150 receives the result (i.e., the switching event for selecting audio channel 2) of the key manipulation, MPU 150 sends gain control signal k (FIG. 9) to gain-controlled amplifier 18, or sends command E156 to digital attenuator 180 (FIG. 10), at time t10 in FIG. 6, for example. In response to the sent signal k or sent command E156, the preceding Japanese speech (audio channel 1) is muted and, from the playback (time t20 in FIG. 6) of the video frame (the video of block n+1 in FIG. 6) immediately after the muting, the English speech (audio channel 2) is reproduced (step ST16).

Incidentally, if the current caption should be changed at the same time of the audio channel switching, the following operation may be made. That is, after both manipulations of the audio selection and the caption selection (e.g., an English caption is changed to a French captions or the caption display is cancelled) are done, the selected results are entered to MPU 150 (e.g., by hitting an enter key, not shown). In this case, the caption switching process is executed during the period of time t10 to time t20 in FIG. 6, and the succeeding video playback using the new caption obtained by the caption switching is started from the next video frame (step ST16).

The following switching events (by which the current execution of MPU 150 is interrupted) can be generated at step ST12 of FIG. 11:

<switching event 1>

This event will be generated by the user's key operation (manual) for changing the view angle or scene, where optical disk 10 includes multi-angle video blocks capturing the same object or target with various view angles, or disk 10 includes multi-scene video blocks recording a scene of leading actor A with sub-actor B and another scene of leading actor B with sub-actor A;

<switching event 2> a) This event will be generated by the user operation of changing (conventionally using a menu on the display) the volume or the video title set (cf. FIG. 2) during the video playback, or b) this event will be generated by the NAV control command in a NAV pack during the video playbacks which command links (calls) the processing of MPU 150 to (for) the menu display for changing the volume or the video title set during the video playbacks or causes the processing to jump (branch) to the menu display routine, or causes to resume the preceding menu display;

<switching event 3> a) This event will be generated by the user operation to enter a still picture mode during the video playback, or b) this event will be generated by the NAV control command in a NAV pack to enter a still picture mode during the video playback;

<switching event 4> a) This event will be generated, during the video playback, by the user operation to enter a fast-forward, rewind, slow-motion playback, or reverse playback, or b) this event will be generated, during the video playback, by the NAV control command in a NAV pack to enter a fast-forward, rewind, slow-motion playback;

<switching event 5> a) This event will be generated, during the video playback, by the user operation to enter searching for a desired cell (group of one or more data pieces of video object unit VOBU in FIG. 2) or desired title set, b) this event will be generated, during the video playback, by the NAV control command in a NAV pack so as to link (call) the processing of MPU 150 to (for) the searching for optional cell or optional title set, or to jump (branch) to the searching routine, or to resume the preceding searching, or c) this event will be generated by the detection of the final video object unit VOBU (FIG. 2) during the repeating video playback, or during memory video playback for playing back image information temporarily stored in a memory (not shown) such as an internal video memory of demodulator 14 (FIG. 9) or of mixer 142 (FIG. 10);

<switching event 6>

This event will be generated by the detection of the end of program chain PGC during the video playback, when current program chain PGC is automatically changed to the next program chain; and <switching event 7>

This event will be generated by the user operation of changing the sub-picture channel (e.g., changing of the language used for the caption).

In summary, the audio channel switching of step ST14 in FIG. 11 is performed when the audio speech (voice/sound) or the sub-picture is freely changed by a user or audience, or when a certain process relating to the audio channel switching or to the sub-picture switching is automatically executed by the command(s) of a display control program contained in the program source.

Figure 12:
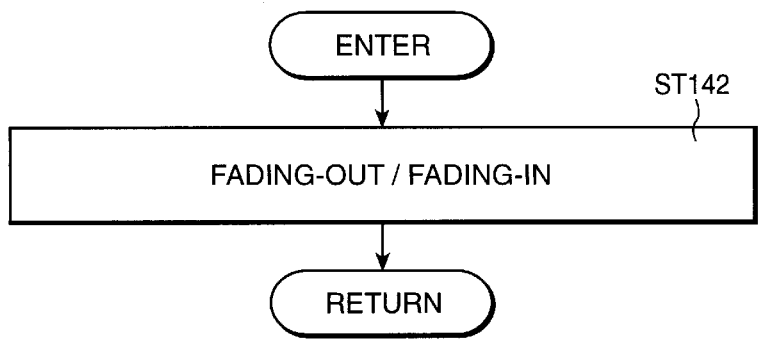
FIG. 12 explains a first case of the audio channel switching (ST14 in FIG. 11) executed by the system control computer (MPU/CPU) of FIG. 9 or FIG. 10.

FIG. 12 explains a first case of the audio channel switching (step ST14 in FIG. 11) executed by the system control computer (MPU/CPU) of FIG. 9 or FIG. 10. When the audio channel switching event is generated (yes in step ST12 of FIG. 11), the fading-out and fading-in of the audio output (step ST142) are simply performed (cf. FIG. 4).

Figure 13:
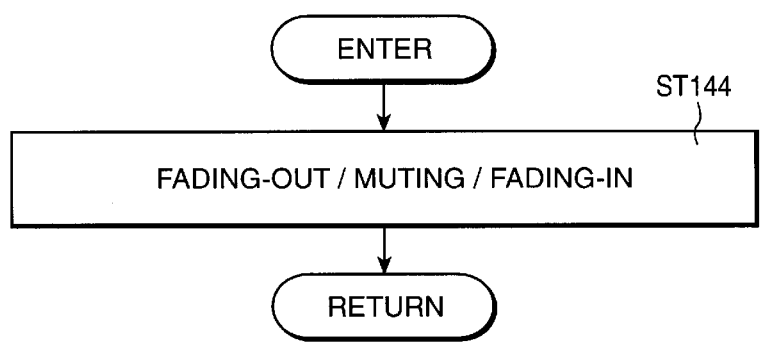
FIG. 13 explains a second case of the audio channel switching (ST14 in FIG. 11) executed by the system control computer (MPU/CPU) of FIG. 9 or FIG. 10.

FIG. 13 explains a second case of the audio channel switching (step ST14 in FIG. 11) executed by the system control computer (MPU/CPU) of FIG. 9 or FIG. 10. When the audio channel switching event is generated (yes in step ST12 of FIG. 11), between the fading-out and fading-in, muting of the audio output (step ST144) is performed (cf. FIG. 5).

Figure 14:
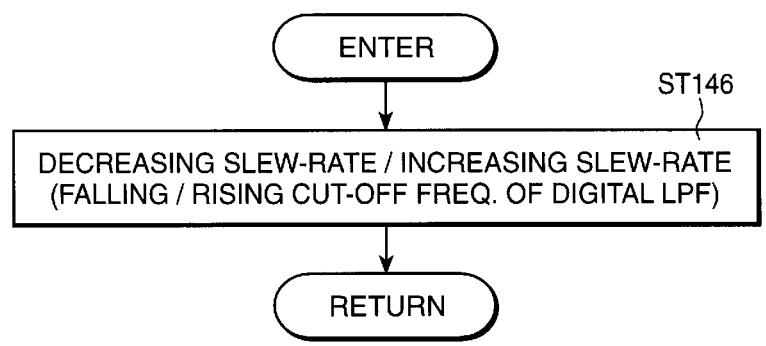
FIG. 14 explains a third case of the audio channel switching (ST14 in FIG. 11) executed by the system control computer (MPU/CPU) of FIG. 9 or FIG. 10.

FIG. 14 explains a third case of the audio channel switching (step ST14 in FIG. 11) executed by the system control computer (MPU/CPU) of FIG. 9 or FIG. 10. When the audio channel switching event is generated (yes in step ST12 of FIG. 11), the slew rate of the audio output is temporarily reduced and, after completing the audio channel switching, the slew rate is returned to the value given before the audio channel switching (step ST146). This slew rate processing can be achieved by largely changing the low-pass cut-off frequency of digital filter 182 in FIG. 10, for example.

Figure 15:
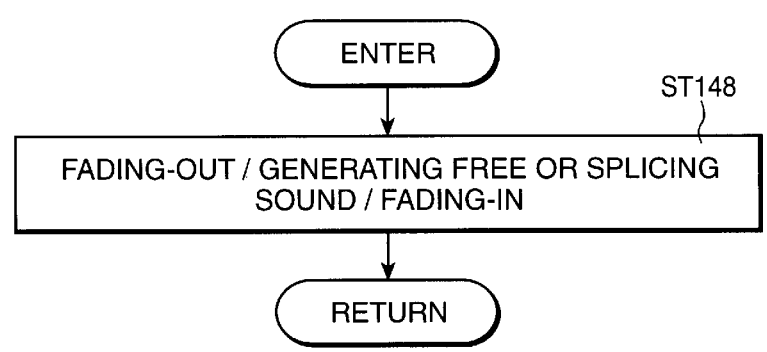
FIG. 15 explains a fourth case of the audio channel switching (ST14 in FIG. 11) executed by the system control computer (MPU/CPU) of FIG. 9 or FIG. 10.

FIG. 15 explains a fourth case of the audio channel switching (step ST14 in FIG. 11) executed by the system control computer (MPU/CPU) of FIG. 9 or FIG. 10.

When the audio channel switching event is generated (yes in step ST12 of FIG. 11), between the fading-out and fading-in, a predetermined sound (e.g., a chime sound generated by sound source 184 in FIG. 10) is inserted to the audio output (step ST148).

Figure 16:
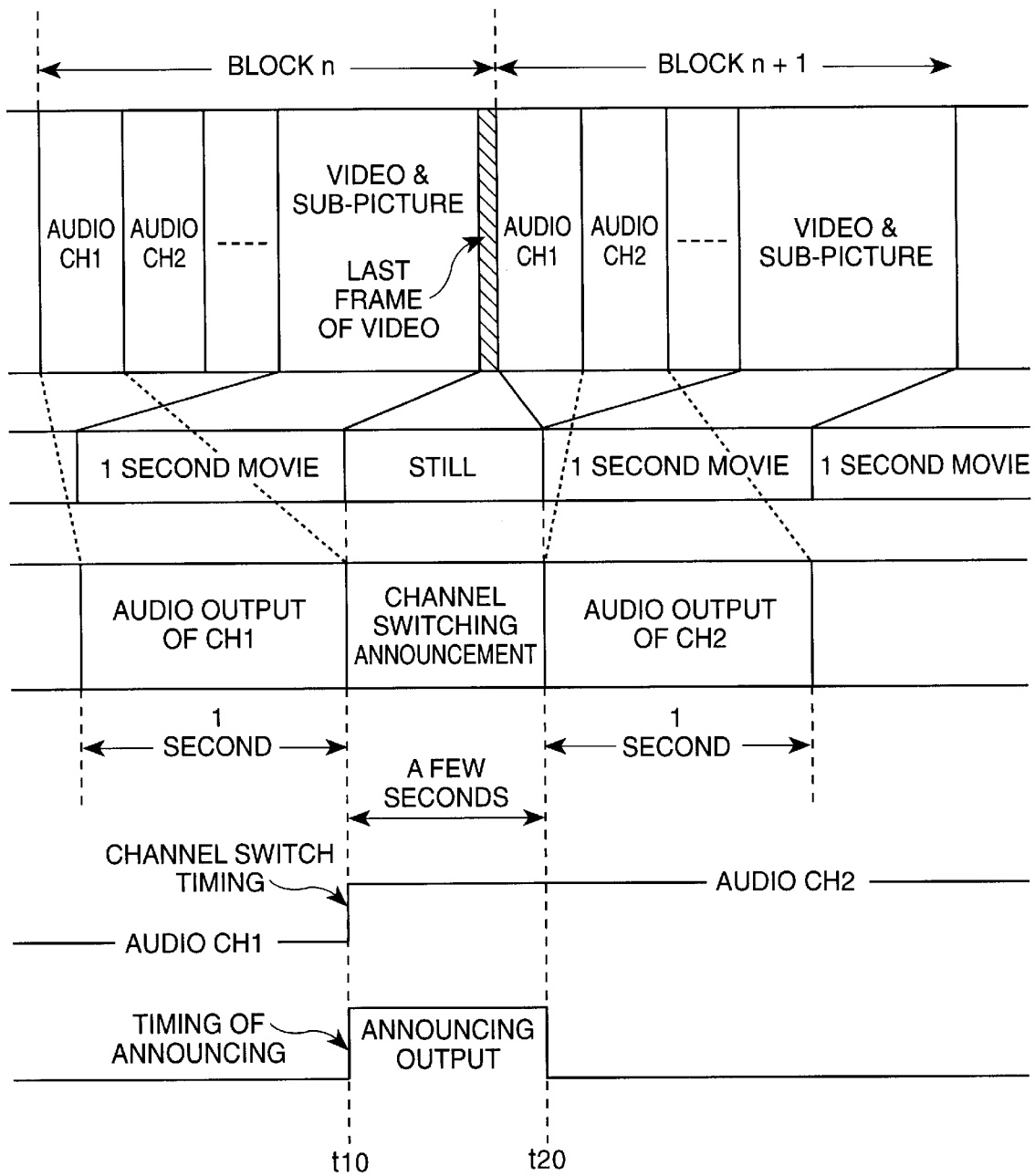
FIG. 16 explains a fourth example of audio channel switching operation (fading-out/announcing/fading-in) wherein the content of audio information is switched from audio channel 1 (e.g., Japanese) to audio channel 2 (e.g., English)

FIG. 16 explains a fourth example of audio channel switching operation (fading-out/announcing/fading-in) wherein the content of audio information is switched from audio channel 1 (e.g., Japanese) to audio channel 2 (e.g., English). Furthers FIG. 17 explains a case corresponding to the audio channel switching operation of FIG. 16.

For instance, when the audio channel switching event is generated (yes in step ST12 of FIG. 11) according to the result of a menu manipulation through which a user changes Japanese audio channel 1 to English audio channel 2, then digital attenuator 180 in FIG. 10 operates to attenuate the audio output so that the Japanese speech sound immediately before the audio channel switching is faded out (step ST150; time t10 in FIG. 16).

When the Japanese speech of audio channel 1 is faded out, the final video frame of block n reproduced at the time of the fading-out is temporarily stored in a frame memory (not shown) in video mixer 142 of FIG. 10, for example. The temporary stored picture of the final video frame is reproduced (played back) as a still picture (step ST152). Or, when the Japanese speech of audio channel 1 is faded outs the final video frame of block n reproduced at the time of the fading-out is temporarily replaced with an image pattern stored in an internal ROM of system controller 150 of FIG. 10, for example (step ST152).

During (time t10 to time t20 in FIG. 16; conventionally a few seconds) the display of the still picture of the final video frame of block n in FIG. 16, or during the video display of the ROM pattern from system controller 150 in FIG. 10, a message (cf. FIG. 18) for indicating that the audio is changed to English of channel 2 is displayed, while a voice announcement indicating the channel change to English (e.g., "Now, the language will be changed to English") is generated once or is repeated two or more times. The voice data of this announcement can be stored in a ROM of sound source 184 in FIG. 10.

During the message of changing to audio channel 2 (English) is displayed and the voice announcement thereof is performed, the optical reading unit (laser head) 11 in FIG. 9 shifts to the specific track of optical disk 10, on which the block (n+1) to be reproduced next is recorded, and optical reading unit 11 stands by on the specific track.

When the voice announcement (e.g., "the audio channel will be changed to channel 2 for English") is completed, or a predetermined time (a few seconds of t10 to t20 in FIG. 16) provided for the announcement elapsed (yes in step ST156), the data of the still picture stored in the internal frame memory (RAM) of video mixer 142 in FIG. 10 is erased, or the reading operation of the image pattern from the ROM of system controller 150 is ended (step ST158). Thereafter, the audio output is faded in (step ST160), and the video playback is re-started (returned to step ST16 of FIG. 11) from block n+1 of FIG. 16, with the English speech of audio channel 2.

FIG. 18 shows an example of attention display (corresponding to the audio channel switching operation of FIG. 16) performed when the language for the current video is switched from audio channel 1 (Japanese) to audio channel 2 (English).

Figure 17:
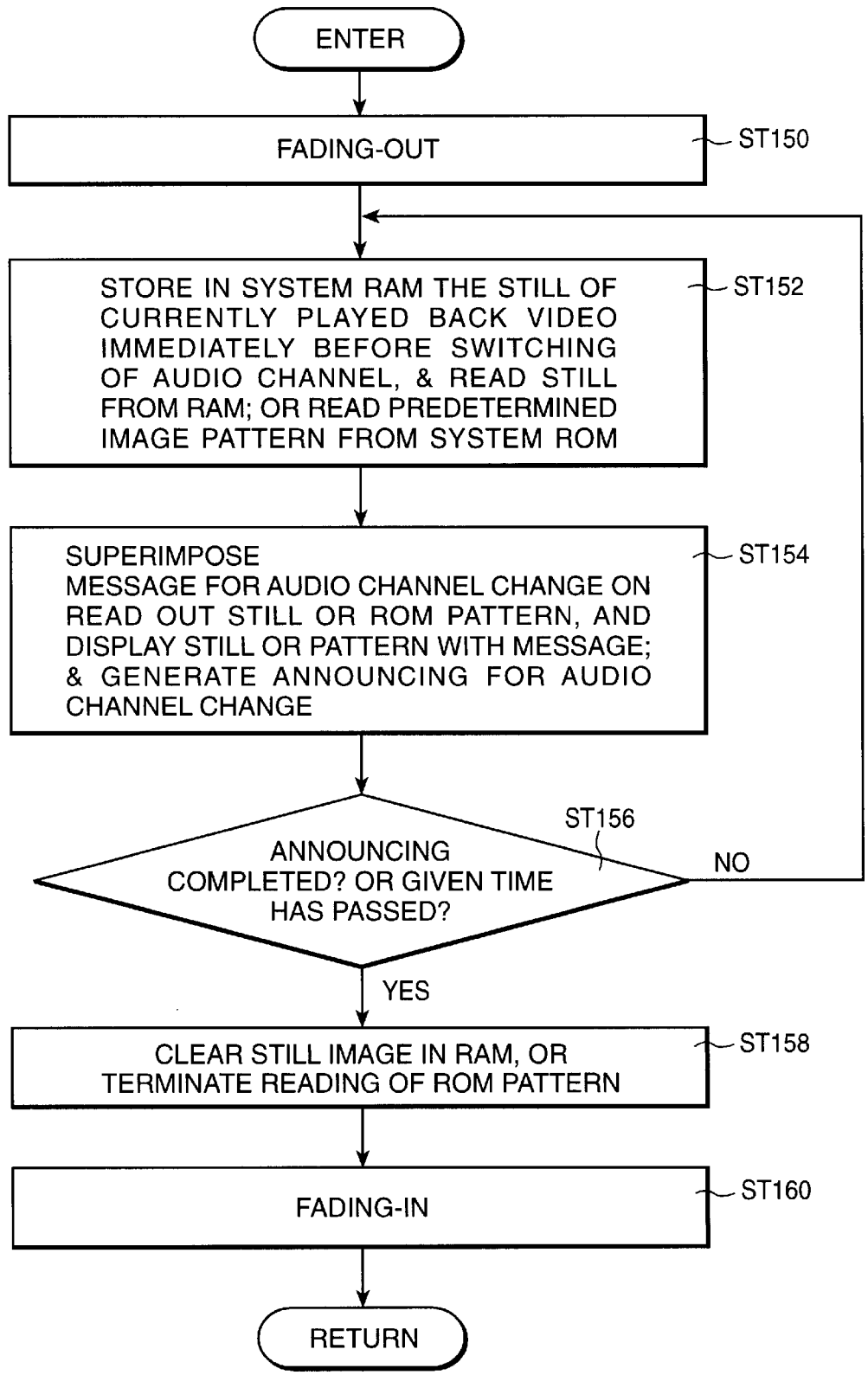
FIG. 17 explains a fifth case (corresponding to the audio channel switching operation of FIG. 16) of the audio channel switching (ST14 in FIG. 11) executed by the system control computer (MPU/CPU) of FIG. 9 or FIG. 10.

This display is performed at step ST154 of FIG. 17 for example. If a user (or a control command of the NAV pack in FIG. 2) selects the French of audio channel 3, the rectangular frame held by the right hand of the bear picture shown at the right side of FIG. 18 is changed to encompass the word "FRENCH" of channel CH3 (Note that the audio channel selection menu displayed before starting the disk may be similar to the image of FIG. 18.)

Figure 19:
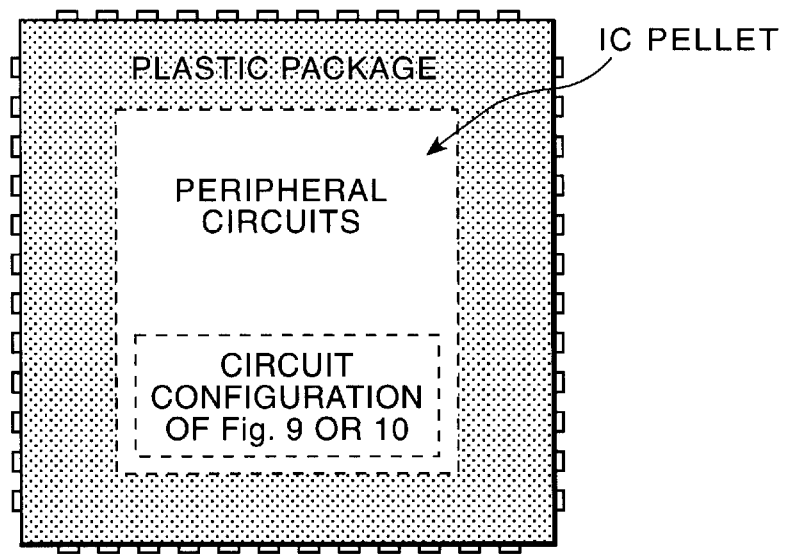
FIG. 19 shows an example of the outline of an IC device in which the circuit configuration of FIG. 9

FIG. 19 shows an example of the outline of an IC device in which the circuit configuration of FIG. 9 or FIG. 10 is integrated.

Generally, the output control system for switchable audio channels according to the present invention is utilized for an optical disk player as shown in FIG. 9. However, the actual products of the embodiment of the present invention can be mass-produced in the form of semiconductor IC's. In this case, for example, circuit components 12 to 18 of FIG. 9 can be integrated in one IC pellet (or in a chip set of two or more IC's). The semiconductor IC chips thus produced can be enclosed in a package as shown in FIG. 19, and they can be distributed in a market.

A reproduction apparatus having an optical disk as a recording medium has been exemplified in each embodiment described above. However, the present invention is also applicable to other recording media such as a magnetic tape, a magnetic disk, and a magnetooptical disk.

According to the present invention, as has been described above, generation of noise during audio channel switching can be effectively prevented. External input of an invalid channel number representing a channel non-recorded on the recording medium can be invalidated to prevent operational disorder. In addition, message information representing this can be superposed and displayed on the video during reproduction. The number of channels of the audio data recorded on the recording medium and the contents in units of channels can be displayed, thereby improving the operability of audio channel selection.

What is claimed is:

1. An apparatus for reproducing information from an information recording medium in which data blocks including video data with audio channels are recorded, said video data including different views of a single event, said apparatus comprising:

means for switching among said different views of said single event;

means for selecting one of said audio channels, each of which being capable of recording audio data;

means for reproducing audio data recorded on said selected audio channel and for generating an audio output signal based on said audio data when video data corresponding to said selected audio channel is reproduced;

fade-out means for fading out said audio output signal of said selected audio channel generated by said reproducing means when said selecting means selects another of said audio channels in response to a switch among said different views of said single event; and fade-in means for fading in said audio output signal which is generated by said reproducing means based on audio data recorded on another of said audio channels.

2. An apparatus for reproducing information from an information recording medium in which data blocks including video data with audio channels are recorded, said video data including different views of a single event, said apparatus comprising:

means for specifying one of multiple number marks respectively assigned to multiple audio channels, each audio channel being capable of recording audio data;

means for selecting the audio channel corresponding to the number mark specified by said specifying means;

means for reproducing audio data contained in the audio channel selected by said selecting means and for generating an audio output signal based on said audio data when video data corresponding to said selected audio channel is reproduced;

fade-out means for fading out said audio output signal of said selected audio channel generated by said reproducing means when said selecting means selects another of said audio channels in response to a switch among said different views of said single event; and fade-in means for fading in said audio output signal which is generated by said reproducing means based on audio data recorded on another of said audio channels.

3. The apparatus of claim 2, further comprising:

means for superimposing message information on an image of the video data so as to provide a video output with messages said message information indicating any of an available number of the audio channels, available languages, and a specific one of languages to be selected.

4. An apparatus for reproducing information from an information recording medium in which data blocks including video data with audio channels are recorded, said video data including different views of a single event, said apparatus comprising:

means for selecting any one of said audio channels, each audio channel being capable of recording audio data;

means for reproducing audio data contained in the audio channel selected by said selecting means and for generating an audio output signal based on said audio data when video data corresponding to said selected audio channel is reproduced;

fade-out means for fading out said audio output signal of said selected audio channel generated by said reproducing means when said selecting means selects another of said audio channels in response to a switch among said different views of said single event; and fade-in means for fading in said audio output signal which is generated by said reproducing means based on audio data recorded on another of said audio channels.

5. The apparatus of claim 4 further comprising:

means, responsive to an external request, for providing information with respect to respective contents of the audio channels.

6. An audio channel switchable system applied to a program source recording one or more video object units, each video object unit containing video data and plural kinds of audio data corresponding to the video data, said video data including different views of a single event, said system being adapted to reproduce the video data and, optionally, at least a part of the audio data, said system comprising:

means for switching among said different views of said single event;

means for optionally selecting one kind of said audio data;

means for reproducing the audio data selected by said selecting means while the video data corresponding to the selected audio data is reproduced; and fading out/in means for fading out an audio output corresponding to a first kind of the audio data when the first kind audio data is switched to a second kind of the audio data in response to a switch among said different views of said single event, and, thereafter, for fading in an audio output corresponding to the second kind audio data.

7. An audio channel switchable system applied to a program source recording one or more video object unit each containing video data and plural kinds of audio data corresponding to the video data, said video data including different views of a single event, said system being adapted to reproduce the video data and, optionally, at least a part of the audio data, said system comprising:

means for switching among said different views of said single event;

means for optionally selecting one kind of said audio data;

means for reproducing the audio data selected by said selecting means while the video data corresponding to the selected audio data is reproduced; and fading out/in means for fading out an audio output corresponding to a first kind of the audio data when the first kind audio data is switched to a second kind of the audio data in response to a switch among said different views of said single event, and for fading in an audio output corresponding to the second kind audio data after the audio output has been faded out for a given period of time.

8. An audio channel switchable system applied to a program source recording one or more video object units each containing video data and plural kinds of audio data corresponding to the video data, said video data including different views of a single event, said system being adapted to reproduce the video data and, optionally, at least a part of the audio data, and said system comprising:

means for switching among said different views of said single event;

means for optionally selecting one kind of said audio data;

means for reproducing the audio data selected by said selecting means while the video data corresponding to the selected audio data is reproduced; and fading out/in means for fading out an audio output corresponding to a first kind of the audio data when the first kind audio data is switched to a second kind of the audio data in response to a switch among said different views of said single event, and for fading in an audio output corresponding to the second kind audio data after a predetermined tone or voice has been generated for a given period to time.

9. An audio channel switchable system applied to a program source recording one or more video object units each containing video data and plural kinds of audio data corresponding to the video data, said video data including different views of a single event, said system being adapted to reproduce the video data and, optionally, at least a part of the audio data, and said system comprising:

means for switching among said different views of said single event;

means for optionally selecting one kind of said audio data;

means for reproducing the audio data selected by said selecting means while the video data corresponding to the selected audio data is reproduced; and fading out/in means for fading out an audio output corresponding to a first kind of the audio data when the first kind audio data is switched to a second kind of the audio data in response to a switch among said different views of said single event, and for fading in an audio output corresponding to the second kind audio data after generating a predetermined announcement based on the second kind audio data.

10. An audio channel switchable system applied to a program source recording one or more video object units each containing video data and plural kinds of audio data corresponding to the video data, said video data including different views of a single event, said system being adapted to reproduce the video data and, optionally, at least a part of the audio data, and said system comprising:

means for switching among said different views of said single event;

means for optionally selecting one kind of said audio data;

means for reproducing the audio data selected by said selected means while the video data corresponding to the selected audio data is reproduced; and fading out/in means for fading out an audio output corresponding to a first kind of the audio data when the first kind audio data is switched to a second kind of the audio data in response to a switch among said different views of said single event, and for fading in an audio output corresponding to the second kind audio data after displaying information based on the second kind audio data on a display screen of the video data.

11. The system of claim 10, wherein the information being displayed on the display screen of said video data includes:

one or more kinds of languages contained in said audio data; and one or more channel members respectively corresponding to the kinds of said languages.

12. A method of switching audio channels applied to a program source recording one or more video object units each containing video data and plural kinds of audio data corresponding to the video data, said video data including different views of a single event, said method being adapted to reproduce the video data and, optionally, at least a part of the audio data, and said method comprising the steps of:

switching among said different views of said single event:

reproducing an optional audio data selected from a plural kinds of the audio data while the video data relating to a selected audio data is reproduced;

fading out an audio output corresponding to a first kind of the audio data when the first kind audio data is switched to a second kind of the audio data in response to a switch among said different views of said single event; and fading in the audio output of the second kind audio data.

13. A method of switching audio channels applied to a program source recording one or more video object units each containing video data and plural kinds of audio data corresponding to the video data, said video data including different views of a single event, said method being adapted to reproduce the video data and, optionally, at least a part of the audio data, and said method comprising the steps of:

switching among said different views of said single event;

optionally selecting one kind of said audio data;

reproducing the selected audio data while the video data corresponding to the selected audio data is reproduced;

fading out an audio output corresponding to a first kind of the audio data when the first kind audio data is switched to a second kind of the audio data in response to a switch among said different views of said single event; and fading in an audio output corresponding to the second kind audio data after generating a predetermined announcement based on the second kind audio data.

14. A method of switching audio channels applied to a program source recording one or more video object units each containing video data and plural kinds of audio data corresponding to the video data, said video data including different views of a single event, said method being adapted to reproduce the video data and, optionally, at least a part of the audio data, and said method comprising the steps of:

switching among said different views of said single event;

optionally selecting one kind of said audio data;

reproducing the selected audio data while the video data corresponding to a first kind of the audio data when the first kind audio data is switched to a second kind of the audio data in response to a switch among said different views of said single event; and fading in an audio output corresponding to the second kind audio data after displaying information based on the second kind audio data on a display screen of the video data.

15. The method of claim 14, wherein the information being displayed on the display screen of said video data includes:

one or more kinds of languages contained in said audio data; and one or more channel numbers respectively corresponding to the kinds of said languages.

16. A method of switching audio channels applied to a program source recording one or more video object units each containing the video data and plural kinds of audio data corresponding to the video data, said video data including different views of a single event, said method being adapted to reproduce the video data and, optionally, at least a part of the audio data, and said method comprising the steps of:

switching among said different views of said single event;

reproducing an optional audio data selected from plural kinds of the audio data while the video data corresponding to a selected audio data is reproduced;

fading out an audio output with respects corresponding to a first kind of the audio data when a specific event causes switching from the first kind audio data to a second kind of the audio data in response to a switch among said different views of said single event; and fading in the audio output of the second kind audio data.

17. The method of claim 16, wherein said visual image of the program source includes various scenes respectively directed to the same object or the same actor/actress.

18. The method of claim 16, wherein said specific event occurs when an audience changes a video title set contained in the program source while the video data is reproduced from the program source, said video title set being constituted by a group of the video object units.

19. The method of claim 16, wherein said specific event occurs when a control command contained in the video object units changes current processing of the method to menu processing while the video data is reproduced from the program source, said menu processing being provided for an audience to allow to change volumes or video title sets each of which is constituted by a group of the video object units.

20. The method of claim 16, wherein said specific event occurs when an audience selects a still picture of the video data currently reproduced from the program source.

21. The method of claim 16, wherein said specific event occurs when a control command contained in the video object units selects a still picture of the video data currently reproduced from the program source.

22. The method of claim 16, wherein said specific event occurs when a fast-forwarding operations a rewinding operation, a slow-motion playing back operations or a reverse playing back operation for the program source, which operation is available to an audiences becomes active while the video data is reproduced from the program source.

23. The method of claim 16, wherein said specific event occurs when a control command contained in the video object units activates an operation which has the effect of any of a fast-forwarding operation, a rewinding operation, a slow-motion playing back operation, and a reverse playing back operation for the program source while the video data is reproduced from the program source.

24. The method of claim 16, wherein said specific event occurs when an optional one of video title sets or an optional one of cells is searched while the video data is reproduced from the program source, said optional one video title set including a group of the video object units, and said optional one cell being constituted by one or more of the video object units.

25. The method of claim 16, wherein said specific event occurs when a control command contained in the video object units searches an optional one of video title sets or an optional one of cells while the video data is reproduced from the program source, said optional one video title set including a group of the video object units, and said optional one cell being constituted by one or more of the video object units.

26. The method of claim 16, wherein said specific event occurs when a last one of the video object units in the program source is detected while the video data is repeatedly reproduced from the program source, or the video data temporarily stored in a memory is reproduced.

27. The method of claim 16, wherein said program source comprising a plurality of program chains, and said specific event occurs when an end of one of the program chains is detected while the video data or the audio data is reproduced from the program source, and a next one of the program chains is automatically selected for subsequent reproduction.

28. The method of claim 16, wherein said video data comprises main picture information and sub-picture information pieces corresponding to contents of the main picture information, and said specific event occurs when an audience changes one of the sub-picture information pieces to another one while the video data is reproduced from the program source.

* * * * *